United States Patent
Hoppe et al.

[11] Patent Number: 5,909,988
[45] Date of Patent: Jun. 8, 1999

[54] UNIVERSAL COMBINED MILLING AND BORING MACHINE

[75] Inventors: Gerd Hoppe, Habichtswald; Alfred Geissler, Pfronten; Karl-Heinz Schäfer, Füssen, all of Germany

[73] Assignee: Deckel Maho GmbH, Pfronten, Germany

[21] Appl. No.: 08/947,992

[22] Filed: Oct. 9, 1997

[30] Foreign Application Priority Data

Oct. 10, 1996 [DE] Germany ............... 196 41 831

[51] Int. Cl.⁶ ................................. B23Q 1/25
[52] U.S. Cl. .................. 409/198; 408/89; 409/221; 409/224; 409/234
[58] Field of Search ............... 408/88, 89, 90, 408/91, 234; 409/198, 221, 224, 231, 233; 29/26 A, 26 R

[56] References Cited

U.S. PATENT DOCUMENTS

| | | | |
|---|---|---|---|
| 2,651,975 | 9/1953 | Soloff | 408/89 |
| 3,746,459 | 7/1973 | Kindelan | 408/89 |
| 3,826,584 | 7/1974 | Mengeringhausen | 408/89 |
| 3,998,127 | 12/1976 | Romeu | 409/224 |
| 4,187,601 | 2/1980 | Aldrin | 409/221 |
| 5,669,867 | 9/1997 | Hoppe | 409/224 |

FOREIGN PATENT DOCUMENTS

| | | | |
|---|---|---|---|
| 245103 | 4/1987 | Germany | 408/89 |
| 50757 | 3/1986 | Japan | 409/221 |
| 279249 | 11/1990 | Japan | 408/89 |

*Primary Examiner*—Daniel W. Howell
*Attorney, Agent, or Firm*—Baker & Maxham

[57] ABSTRACT

A universal combined milling and boring machine having a machine column, a compound slide that can traverse horizontally on the machine column, a spindle head mounted on the compound slide so that it can traverse vertically, with a work spindle, a rotary table mounted so it can pivot over a supporting console on the machine column and a control unit. Multiaxial machining with relatively inexpensive control technology and a control system with optimum visual contact with the machining site are made possible according to this invention due to the fact that the supporting console is mounted on the machine column so it can rotate about a horizontal swivel axis. The swivel axis is offset laterally relative to the central axis of the combined milling and boring machine; the rotary table is mounted centrally on the console so it can rotate about an axis of rotation normal to the swivel axis; and the control unit includes a portable control console.

11 Claims, 6 Drawing Sheets

UNIVERSAL COMBINED MILLING AND BORING MACHINE

BACKGROUND OF THE INVENTION

1. Field of the Invention

This invention generally concerns a universal combined milling and boring machine, and more particularly relates to such a machine having a machine column, a compound slide that can travel horizontally on the machine column, a spindle head mounted so it can travel vertically on the compound slide, a revolving table mounted so it can be swiveled over a supporting console on the machine column, and a control unit.

2. Description of Prior Art

Modern machine tools for milling and drilling permit 5-axis machining of a workpiece in one chucking by traveling movements in the three main axes and by additional slewing and revolving movements by means of swiveling circular tables or swiveling spindles or stands, thus making it possible to eliminate the time required for rechucking and still improve manufacturing accuracy. Swiveling circular tables are often available as separate accessory parts that are chucked to the work table as needed. In addition, there is a known machine tool with a motor-driven rotary table that can pivot about a 45°-axis. However, such a machine tool design is relatively expensive, especially the controls for all the traversing and swiveling movements.

Furthermore, another problem with machine tools with swiveling tables is that in certain inclined positions of the work table, the machining position is no longer visible from the operator's console of the control system. This makes it difficult to monitor the machining process, especially in the approach of a tool to a workpiece by manual operation.

SUMMARY OF THE INVENTION

A primary purpose of this invention is to create a compact and inexpensive universal combined milling and boring machine that permits multiaxial machining and control with optimum visual contact with the machining site while using relatively inexpensive control technology.

The offset arrangement of the swiveling rotary table relative to the central axis of the combined milling and boring machine makes it possible to increase the working range in the X axis by twice the amount of the offset. In the horizontal position of the rotary table, it is also possible, by rotating the workpiece by 180°, to machine in one chucking workpieces that are larger by twice the amount of the offset than the given distance between the two end positions of the working spindles, which is determined by the maximum traversing movement of the cross slide. However, precisely due to the possibility of rotating and slewing the table, there may occur certain inclined positions of the workpiece where the point of action of the tool on the workpiece is no longer visible from the operator's console. In this case, the portable control console can be carried by the operator or mounted at a location on the machine suitable for supervising the tool action in order to control certain function sequences of the machine with optimum visual contact with the machining site.

In an expedient embodiment of this invention, hand wheels are provided on the portable control console to control the traversing movements in the three main axes. In this way, the spindle head as well as the saddle carriage and cross slide can also be operated by hand wheels, which is advantageous especially for a set-up operation or for the approach of the tool to the workpiece under unfavorable visual conditions. In addition to the hand wheels for controlling the traversing movements, other components such as emergency OFF switches, operating elements for the coolant supply or other switch elements and displays may also be incorporated into the control console.

For simple mounting of the portable control console on the operator's console of the control system or on any other location on the machine column that is favorable for monitoring the machining site, the control console is accommodated advantageously in a magnetic casing or a casing provided with magnetic mounts.

In an especially expedient embodiment, a cylinder-piston unit surrounding the work spindle is arranged in the spindle head of the universal combined milling and boring machine with an annular piston for operation of a tool chucking fixture integrated into the work spindle. In comparison with traditional embodiments with a pressure piston arranged in connection with the work spindle, the overall length of the spindle head can be reduced in this way.

The chucked and released positions of the tool chucking fixture can be monitored in an advantageous manner by position switches that can be operated without contact by an index ring linked to the annular piston. In comparison with conventional operating pins, the solid index ring permits more reliable monitoring.

A stable connection between the swiveling rotary table and the machine column is achieved by a circular foot of the supporting console that is supported in a suitable recess in the machine column so that it can rotate. For releasable locking of the supporting console in the desired swivel position, clamping elements are provided on the supporting console by which the supporting console can be chucked with respect to the machine column.

In a simple and inexpensive embodiment, the supporting console and the rotary table are rotated by servo drives that can be operated by hand wheels. The servo drive for turning the supporting console may be designed as a crank drive or Geneva gearing. However, the supporting console and the rotary table may also be positioned by means of separate motors that can be actuated by the control system.

BRIEF DESCRIPTION OF THE DRAWING

The objects, features and advantages of this invention will be more clearly perceived from the following detailed description, when lead in conjunction with the accompanying drawing, in which.

DETAILED DESCRIPTION OF THE PREFERRED EMBODIMENTS

Figure 1:
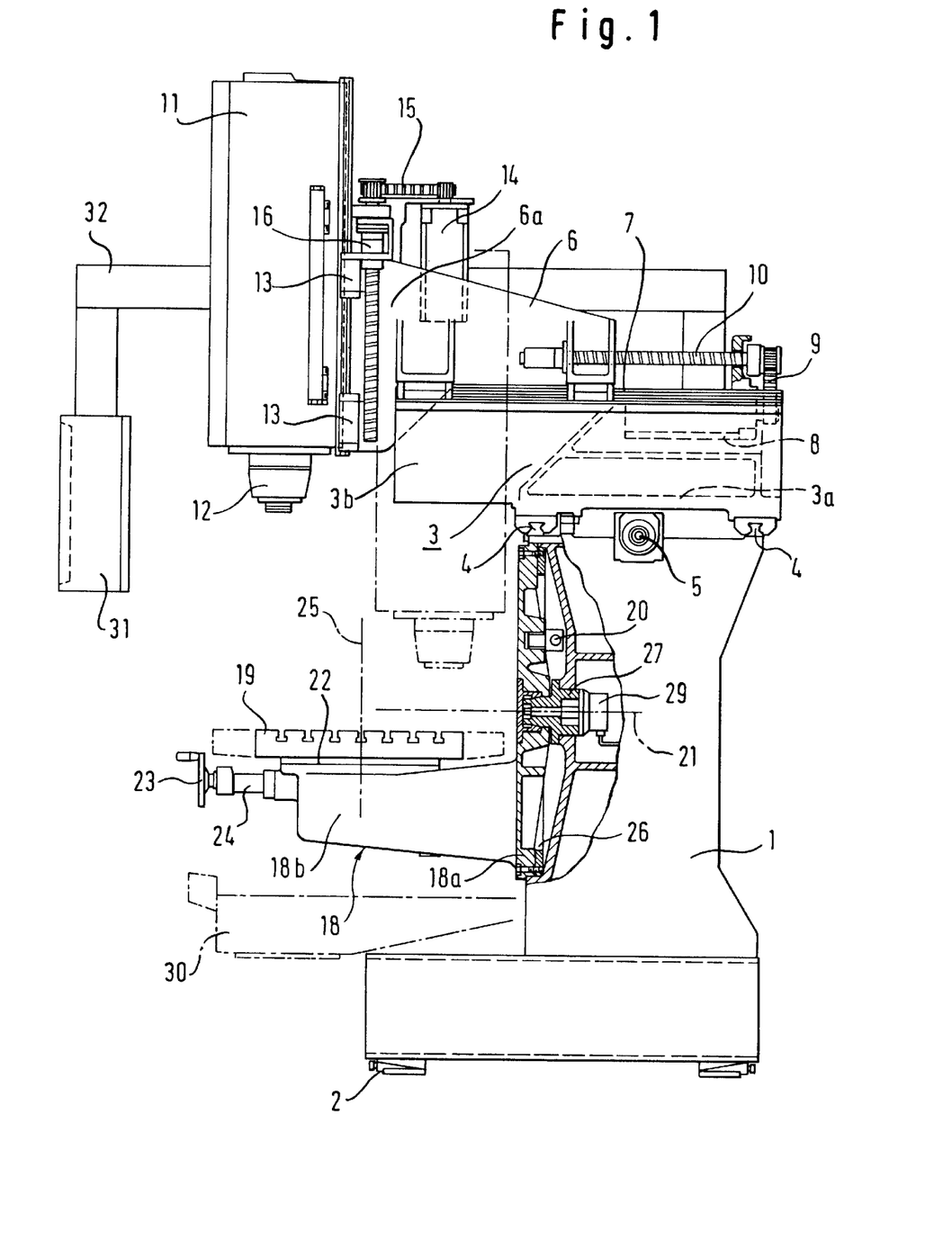
FIG. 1 is a schematic side view of a combined milling and boring machine constructed in accordance with this invention.
Figure 2:
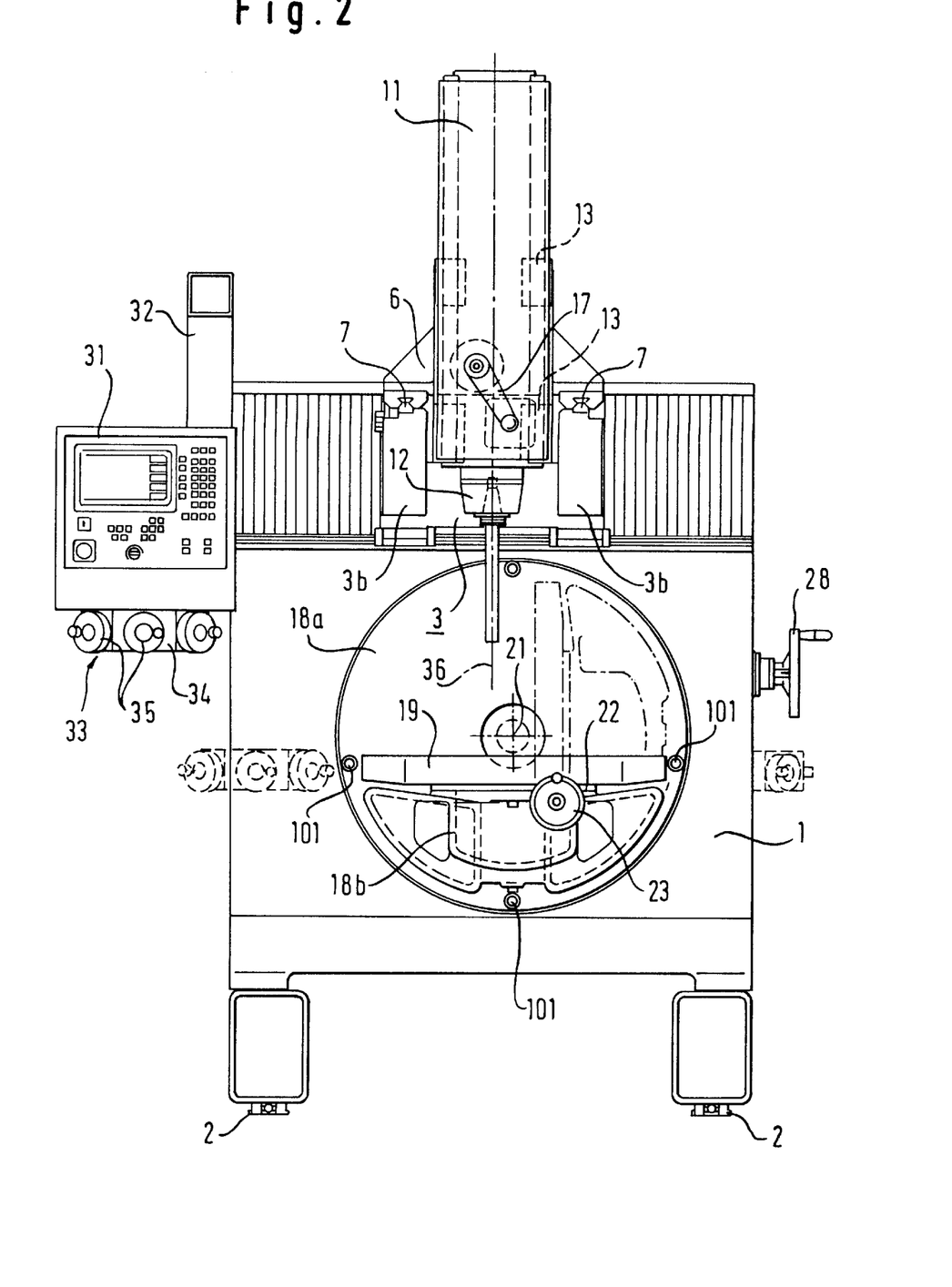
FIG. 2 is a front view of the machine of FIG. 1.

The universal combined milling and boring machine shown in FIGS. 1 and 2 for multiaxial machining of workpieces includes machine column 1 standing upright on a pedestal or on the floor by means of adjustable mounting elements 2. Cross slide 3 is guided horizontally in the X axis on the top side of column 1 by means of parallel linear guides 4 running normal to the plane of the drawing in FIG. 1. Cross slide 3 is driven by a motor (not shown) on ball caster spindle 5. Cross slide 3 has a continuous center part 3a and two side walls 3b which are spaced a distance apart and on which saddle carriage 6 travels in the Z axis over linear guides 7 running normal to the plane of the drawing in FIG. 2. Saddle carriage 6 is driven by motor 8 with toothed belt 9 and spindle 10. Saddle carriage 6 has front part 6a between two side walls 3b, with vertical spindle head 11 guided on the end face of the front part so it can travel vertically in the Y axis over guide elements 13. Spindle head 11 includes work spindle 12. The traversing motion of spindle head 11 is accomplished by motor 14 with toothed belt 15 and drive spindle 16. The vertical position of work spindle 12 can be adjusted manually by hand crank 17 shown in FIG. 2 on the front face of spindle head 11.

Supporting console 18, with work table 19 thereon, is arranged on the front face of machine column 1 so that it can be pivoted about horizontal axis 21 by means of a servo drive 20 shown in FIG. 1 between a horizontal machining position (indicated with solid lines in FIG. 2) and a vertical machining position (shown with dotted lines). Supporting console 18 has circular foot 18a, as seen in the front view in FIG. 2, and supporting projection 18b that extends parallel to the horizontal axis and supports work table 19. The work table is formed as a rotary table on supporting surface 22. This work table can be pivoted about axis 25 normal to swivel axis 21 by servo drive 24 operated by hand wheel 23. Supporting console 18 is supported by its circular foot 18a in matching recess 26 on the front face of column 1 and is guided so it can rotate on journal 27. Servo drive 20 for swiveling the supporting console can be operated by crank handle 28 shown in FIG. 2. The swivel position of supporting console 18 is detected by rotary position transducer 29 that is connected to foot 18a. Below the supporting console, trough 30 (shown with dotted lines in FIG. 1) is attached for collecting the coolant and machining chips.

The combined milling and boring machine illustrated in FIGS. 1 and 2 is provided with a numeric control to which is connected manual operation console 31 with a screen display. Manual operation console 31 is connected to machine column 1 or another load-bearing component by angled supporting arm 32. As FIG. 2 shows, an additional portable control console 33 is also provided and can be displaceably mounted by means of magnetic casing 34, for example, or magnetic mounting elements, on the lower side of manual operation console 31 or in any positions on machine column 1 that would be suitable for monitoring the machining site, as indicated by the positions indicated with dotted lines. Portable control console 33 includes one hand wheel 35 each for manual control of spindle head 11, cross slide 3 and saddle carriage 6. To do so, the rotational movement of the respective hand wheel 35 is converted by suitable converters into electric signals that are sent over a line to the numeric control. Through appropriate output signals of the numeric control, the drive motor provided for the respective hand wheel is activated and driven according to the rotational movement of hand wheel 35 for the traversing movement of spindle head 11, cross slide 3 or saddle carriage 6. The drive shaft of each hand wheel may also be provided with its own brake by means of which a braking force proportional to the output power of the respective drive motor is applied to the drive shaft of the hand wheel.

In this way, the operator can get a feel for the power to be applied by the drive motor and thus the load on the tool. The tool accommodated in the work spindle can be driven into the desired position by hand wheels 35, for example, in set-up operation, with the help of control console 33. Due to the portable design of control console 33, it can be carried by the operator or attached to the machine column at a location suitable for supervising the action of the tool, to thereby permit control of the machining and any required intervention in the program sequence with visual monitoring of the machining site even under restricted visual conditions, such as may be due to an inclined position of the work table.

As FIG. 2 shows, supporting console 18 is arranged so that its swivel axis 21 is offset laterally with respect to center axis 36 of the combined milling and boring machine. Thus, rotary table 19 that is mounted on the center of the supporting console is offset relative to center axis 36. This makes it possible to enlarge the working range, as illustrated in FIGS. 3A and 3B.

Figure 3A:
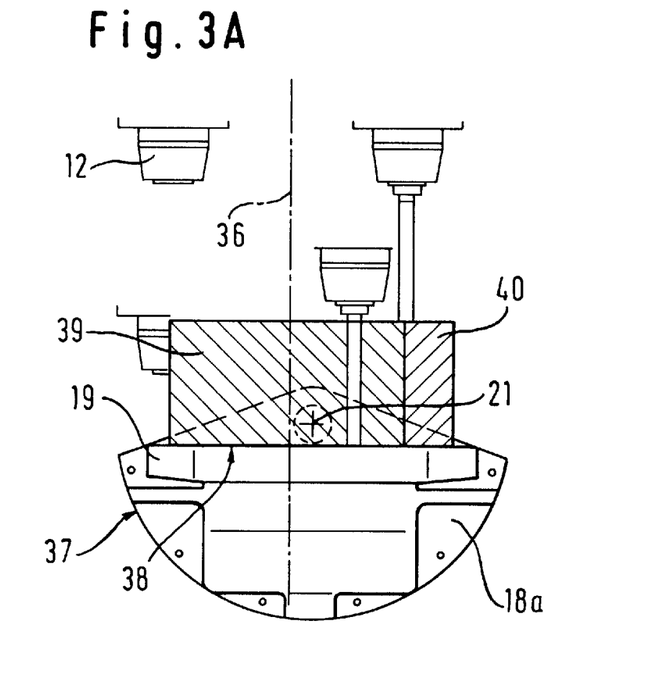
FIGS. 3A and 3B show schematic front views of a swiveling rotary table in respective vertical and horizontal working positions.

FIG. 3A shows swiveling rotary table 37 with its swivel axis 21 offset laterally relative to center axis 36 of the combined milling and boring machine and with a horizontal position of work table 19. In this embodiment, supporting console 18 has circular foot 18a. The upper part of FIG. 3A also shows the two end positions of work spindle 12 defined by the traversing path of cross slide 3. On the basis of these two end positions, a workpiece 38 that is chucked centrally on work table 19 and has the outline shown here in the horizontal position of swiveling rotary table 37 can be machined within hatched sub-area 39 shown at the left of FIG. 3A. Machining of workpiece area 40, shown at the right in FIG. 3A with the opposite direction of hatching, is also possible by a 180° rotation of work table 19 about its axis of rotation 25 which is normal to swivel axis 21. Thus in the horizontal position of work table 19, the working range in the X axis is increased by twice the amount of the lateral offset of swivel axis 21 relative to the center axis of the combined milling and boring machine.

Figure 3B:
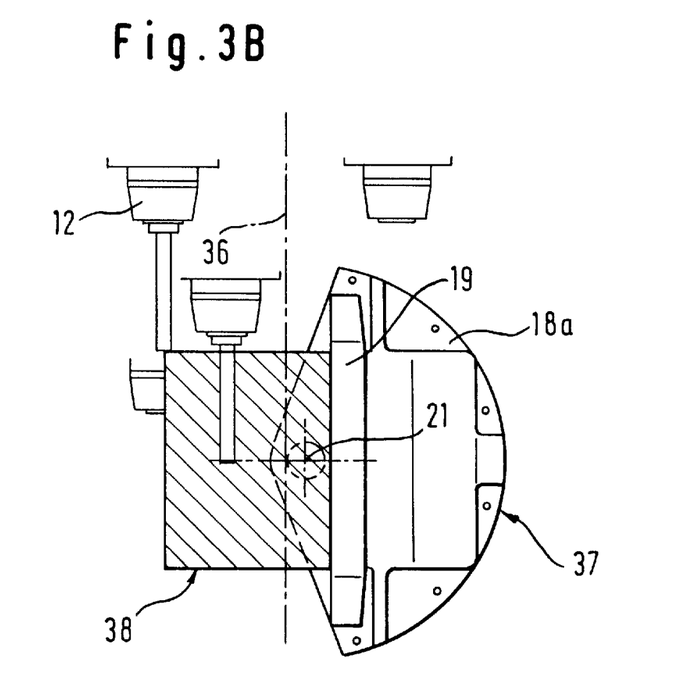

The laterally offset arrangement of supporting console 18 also results in an enlarged working range in the X direction in the vertical position of work table 19 as shown in FIG. 3B. Although in the end positions of work spindle 12 the entire shaded area of workpiece 38 can be machined, the end part of the workpiece, shown at the left in FIG. 3B, could not be reached with a central arrangement of swivel axis 21.

Figure 4:
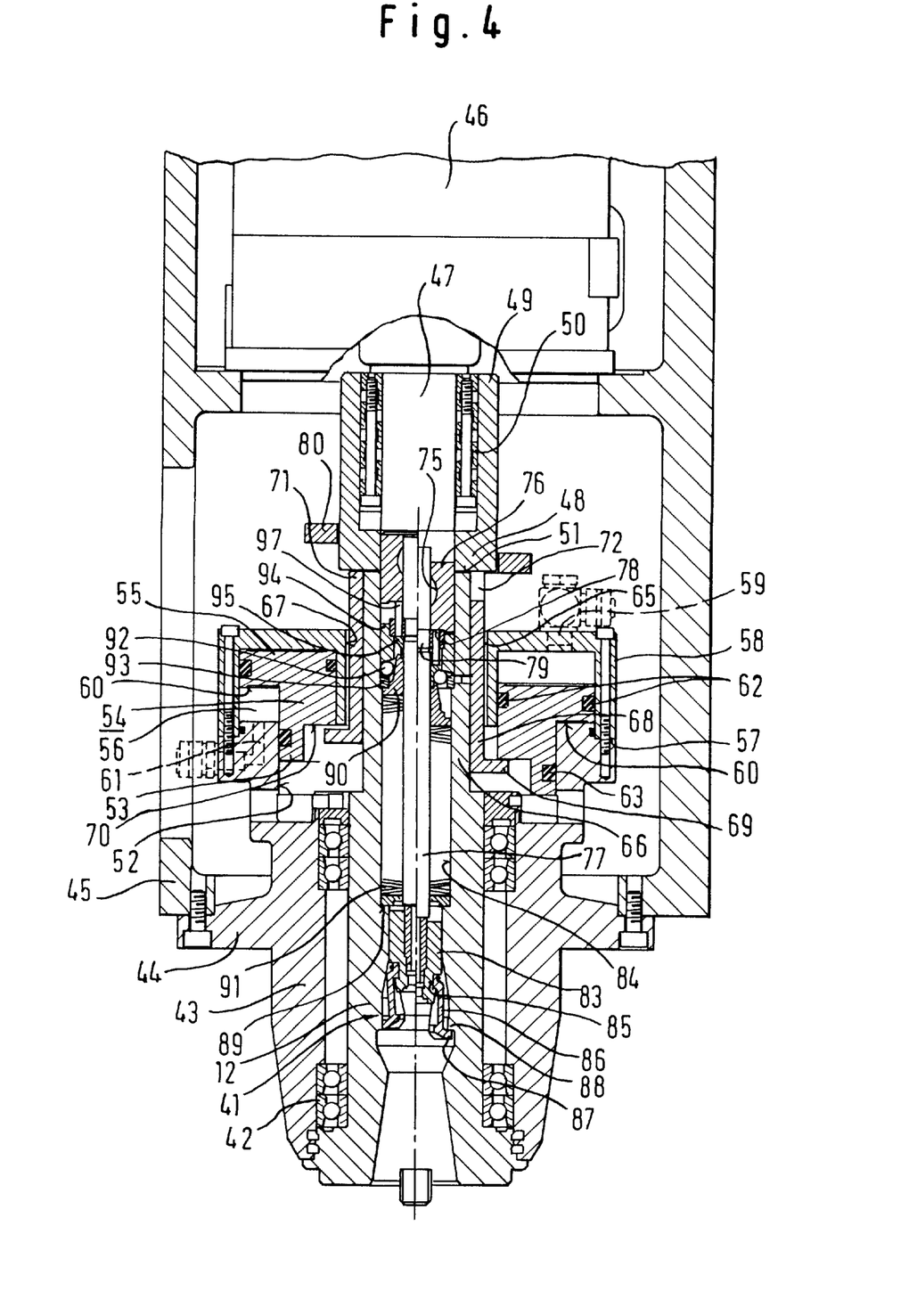
FIG. 4 is a partial sectional split view of a spindle head of the combined milling and boring machine according to this invention, showing the spindle head in two operative positions.
Figure 5:
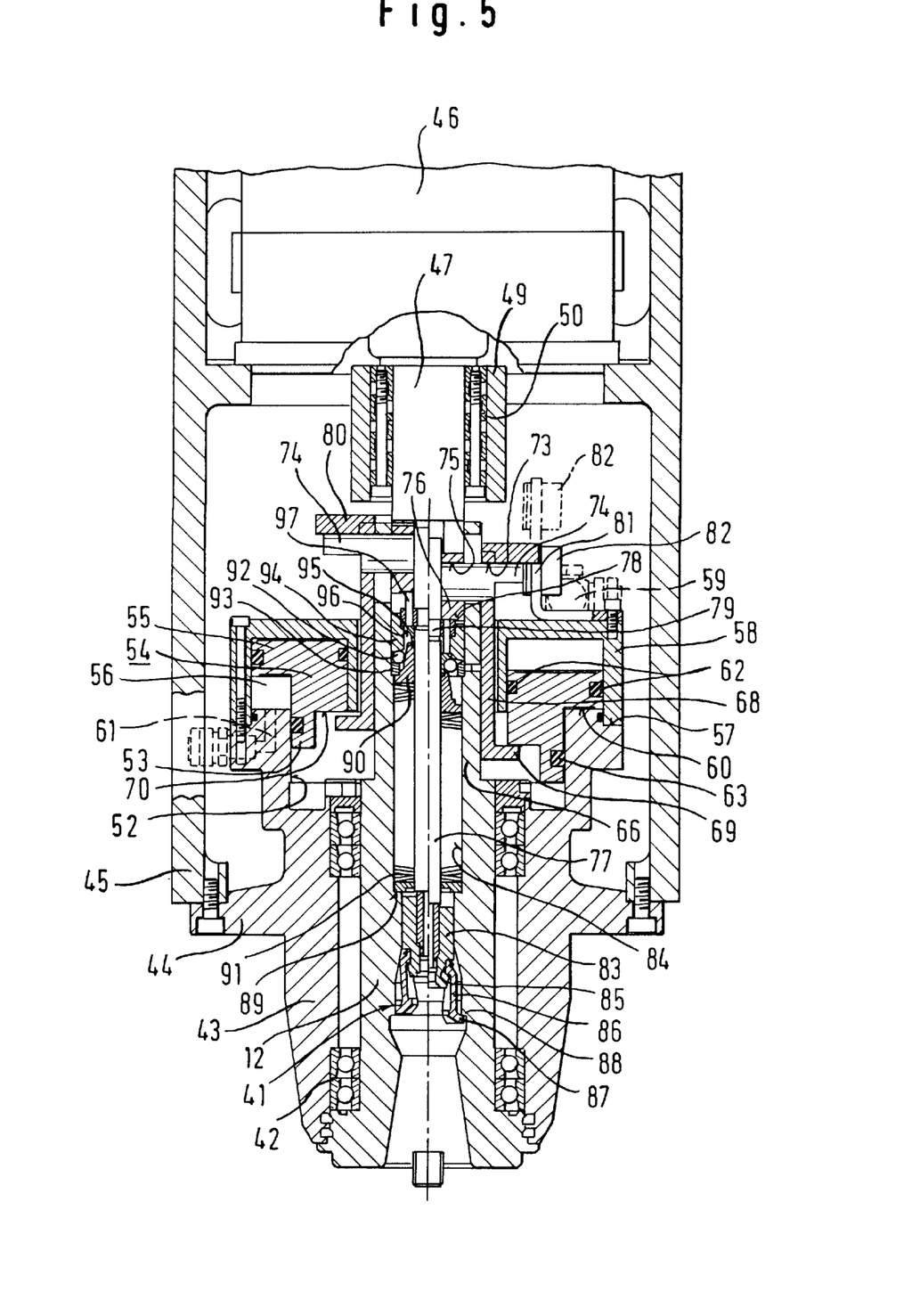
FIG. 5 is a partial sectional view of the spindle head of FIG. 4 with the sectional plane offset by 90°.

Work spindle 12, which is designed as a hollow shaft with an integrated tool chucking fixture 41, is mounted so it can rotate in spindle bushing 43 by means of a bearing arrangement of mutually braced annular contact ball bearing pairs 42 in tandem O arrangement with spindle head 11 shown in FIGS. 4 and 5, the spindle bushing being mounted on the front face of spindle head stock casing 45 by flange 44. In FIGS. 4 and 5, tool chucking fixture 41 is shown in the chucking position in the left half of the figure and in the released position in the right half of the figure. Work spindle 12 is driven by motor 46 arranged coaxially with it in spindle head stock casing 45, with connecting bushing 49 which is provided with two opposing claws 48 being arranged in a rotationally fixed manner on drive shaft 47 of this motor by means of chucking bushing 50. The two opposing claws 48 engage in corresponding recesses 51 on the inner end of work spindle 12, as illustrated in FIG. 1, to transmit the rotational motion.

Spindle bushing 43 has annular recess 52 on its inner end part projecting into spindle head stock casing 45, so that thinner part 53 of annular piston 54 that is coupled coaxially to the work spindle is guided displaceably in this recess. Larger diameter part 55 of annular piston 54 can be displaced in annular space 56 which is designed as a pressure chamber and is bordered by cover 58 screwed onto inner end face 57 of spindle bushing 43. Hydraulic fluid line 59 for applying pressure to the annular piston in the extension direction passes through cover 58. End face 60 at the transition from the thinner part to the wider part of annular piston 54 serves as the piston face for the application of pressure to the annular piston in the retraction direction to which hydraulic fluid line 61 in spindle bushing 43 leads. Annular piston 54 is sealed with respect to cover 58 by ring gaskets 62 and with respect to the inside wall of annular recess 52 by ring gasket 63.

Slide bushing 68 is arranged on work spindle 12 so it is axially displaceable in annular gap 65 between the outer circumference of rear part 66 of work spindle 12 and borehole 67 concentric with it in cover 58. Slide bushing 68 has an annular collar 69 at its lower end in FIG. 4 that is designed for contact with set-back end face 70 on the thinner part of annular piston 54. As shown especially in FIG. 4, slide bushing 68 has two opposing recesses 72 for the two claws 48 of connecting bushing 49 on its upper end part 71.

In upper end part 71 of slide bushing 68 arranged between claws 48, opposing cross holes 73 to accommodate connecting pins 74 that are milled off on the sides are provided, as shown in FIG. 5. Connecting pins 74 arranged in cross holes 73 engage in lateral holes 75 of thrust collar 76 which is guided displaceably on tension rod 77 of tool chucking fixture 41 which is integrated into work spindle 12 and works with inner pressure face 78 on annular collar 79 in the back end area of tension rod 77. Index ring 80 for non-contact actuation of two position switches 82 mounted by strap 81 on cover 58 is attached to the top end face of slide bushing 68 for detecting the chucking position and the released position of tool chucking fixture 41.

Tool chucking fixture 41 contain chucking bushing 83 that is attached to the front end of tension rod 77 which is arranged displaceably in central longitudinal hole 84 of work spindle 12. Gripper claws 86 are mounted so they can pivot in annular groove 85 on the front end of chucking bushing 83, where inclined outside faces 87 of the gripper claws are pressed inward in the chucking position by projection 88 oil the inside wall of work spindle 12 for engaging gripper claws 86 in a suitable groove of a tool or a tool receptacle. In the released position, gripper claws 86 with their inclined outer faces 87 are spread outward by a spring element (not shown) in an enlarged inside bore area. Disk spring package 91 is arranged between annular shoulder 89 and thrust piece 90 with a conical taper. On the outside of the conical part of thrust piece 90 run balls 92 which arc in contact on their outside between the inclined faces of ring 93 whose position is fixed in work spindle 12 and ring 94 that is axially displaceable by annular collar 79. Inside ring 95 that has rounded face 96 facing the thrust piece 90 and is displaceable on the tension rod is in contact with the conical part of thrust piece 90, and the balls 92 come to rest against this rounded face in the released position of tool chucking fixture 41. Inside ring 95 is connected to thrust collar 76 by pins 97 which run through axial holes in annular collar 79.

To release the tool, a hydraulic fluid acts on annular space 56 through line 59, where annular piston 54 is moved from the chucked position illustrated in the left half of FIGS. 4 and 5 to the released position illustrated in the right half of these figures. Annular piston 54 then displaces slide bushing 68 and thrust collar 76 connected to it by connecting pins 74. By means of pins 97, inside ring 95 and thrust piece 90 are first displaced against the force of disk spring package 91, where balls 92 slide radially inward along the conical outside surfaces of thrust piece 90. Then thrust collar 76 with its pressure face 78 pushes tension rod 77 with chucking bushing 83 down over annular collar 79 according to FIGS. 4 and 5, where gripper claws 86 enter an area of the work spindle with an enlarged inside bore, where they are spread outward by spring elements and thus release the tool. Furthermore, ring 94 is displaced from annular collar 79 toward ring 93 until it comes in contact with the ring in the released position of tool chucking fixture 41 and balls 92 are pressed over the inclined faces against the rounding of inside ring 95.

For chucking the tool, annular space 56 is acted on by hydraulic fluid through line 61, with annular piston 54 moving out of the released position into the chucked position, and tension rod 77 is retracted under the influence of disk spring package 91. Gripper claws 86 are also pressed inward into an annular groove of a tool. Balls 92 are pressed radially outward over the conical faces of thrust piece 90 between the two inclined faces of rings 93 and 94 to displace ring 94 and annular collar 79 of tension rod 77. This causes an increase in the retraction force.

The chucking and released positions of tool chucking fixture 41 are monitored by position switches 82, which are operated by index ring 80 on the end face of slide bushing 68.

Figure 6:
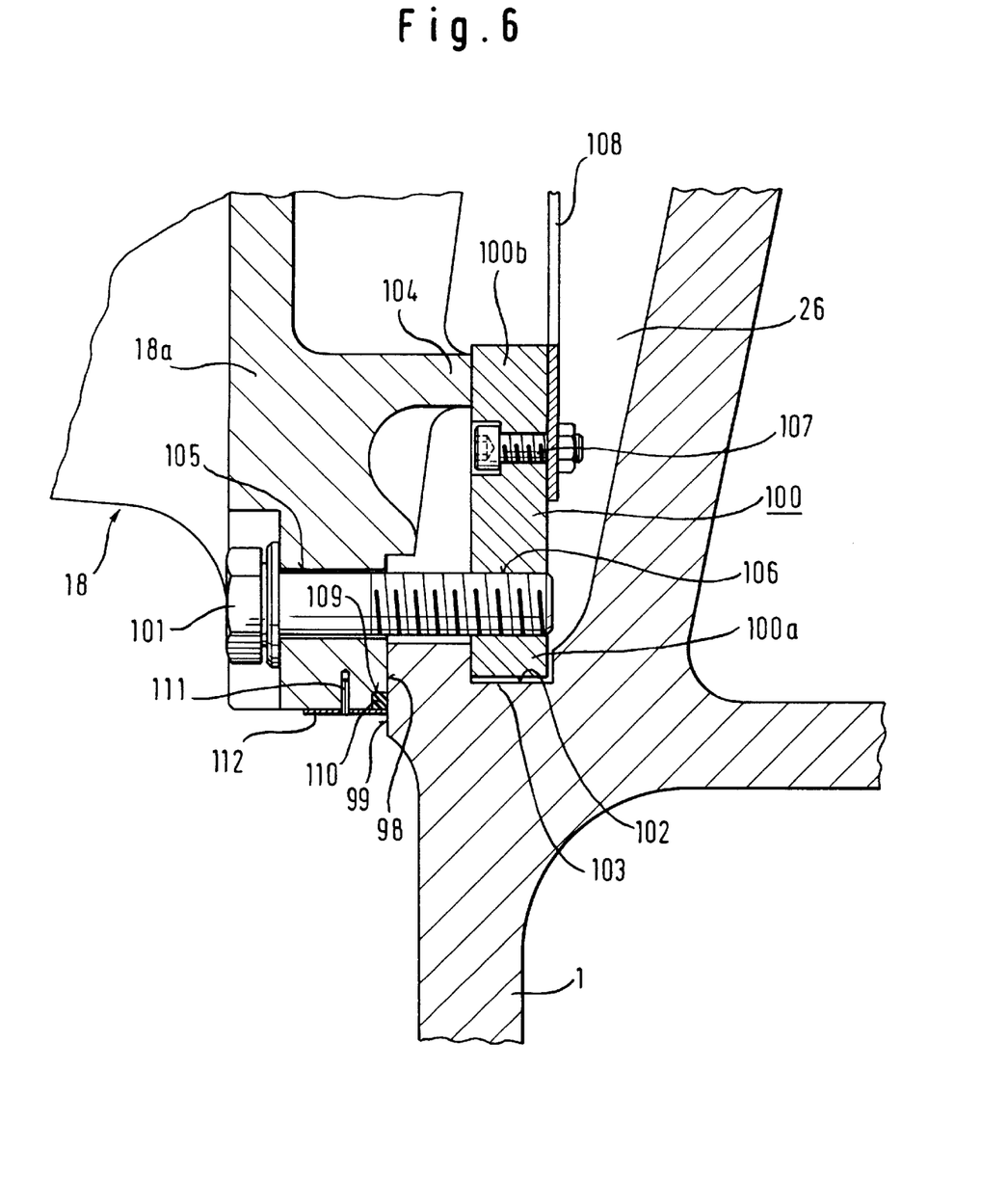
FIG. 6 is an enlarged partial view of a section through the supporting console mount shown in FIG. 1.

FIG. 6 shows an enlarged partial view of the type of console mount on machine column 1 illustrated in FIG. 1. In this embodiment, foot 18a of supporting console 18 is in contact with annular contact face 99 arranged around recess 26 on the front face of column 1 by internal guide face 98 and is held by four clamping pieces 100 distributed around the circumference, which can be locked and released by four bolts 101 which are also shown in FIG. 2. Clamping pieces 100 which have a rectangular cross section engage with their radial outside end part 100a in annular groove 102 on inside wall 103 of recess 26 in column 1. With their radially inside end part 100b, clamping pieces 100 rest against annular shoulder 104 of foot 18a which projects into recess 26. Bolts 101 are arranged in through-holes; 105 in foot 18a and engage with their front threaded section in corresponding threaded hole 106 in respective clamping pieces 100. By tightening bolts 101, supporting console 18 can thus be tightened against machine column 1 and locked in a given swivel position. To swivel supporting console 18, one need only loosen bolts 101 and thus release the clamp. Next, supporting console 18 can be pivoted by servo drive 20 shown in FIG. 1. Clamping pieces 100 are secured by locking bolts 107 on sheet metal ring 108 for mutual fixation of their positions. To prevent coolant or soil from entering recess 26 in column 1, annular groove 109 is provided with ring gasket 110 on the outside of foot 18a in the area of guide face 98. Toward the outside, ring gasket 110 is held by scale belt 112 which is attached to the outside of foot 18a by retaining pins 111 and also serves to provide a visual display of the swivel position of supporting console 18.

This invention is not limited to the embodiment illustrated here. For example, the combined milling and boring machine may also be provided with additional tool magazines and automatic tool changers. An embodiment with an additional cab enclosure is also possible. The invention is to be limited only by the spirit and scope of the accompanying claims.

What is claimed is:

1. A universal combined milling and boring machine having a center axis, said machine comprising:

a machine column;

a compound slide mounted to traverse horizontally on said machine column;

a spindle head mounted to traverse vertically on said compound slide;

a work spindle on said spindle head; a supporting console on said machine column, said supporting console being mounted for rotation about a horizontal swivel axis on said machine column, the swivel axis being laterally offset relative to the center axis of said combined milling and boring machine;

a rotary table mounted for pivoting over said supporting console, said rotary table being mounted for rotation about an axis of rotation normal to the swivel axis at the center of said supporting console; and a control unit having a separable portable control console.

2. The machine recited in claim 1, wherein said portable control console has a manually operated control element for the traversing movements of said compound slide of said spindle head.

3. The machine recited in claim 2, wherein said manually operated control elements are configured as hand wheels.

4. The machine recited in any one of claims 1–3, wherein said portable control console is configured with magnetic elements for mounting at various locations.

5. The machine recited in any one of claims 1–3, wherein said spindle head comprises a cylinder-piston unit arranged around said work spindle and comprises an annular piston for actuation of a tool chucking fixture that is integrated into said work spindle.

6. The machine recited in claim 5, wherein said annular piston is connected to said tool chucking fixture by a slide bushing, and an annular collar coupled to said slide bushing.

7. The machine recited in claim 6, and further comprising two position switches, and an index ring attached to said slide bushing for non-contact operation of said position switches.

8. The machine recited in any one of claims 1–3, wherein said supporting console is configured with a circular foot that is supported in a corresponding recess on said machine column for rotation with respect thereto.

9. The machine recited in any one of claims 1–3, and further comprising manually operated servo drives for rotation of said supporting console and said rotary table.

10. The machine recited in any one of claims 1–3, and further comprising a motor drive for rotation of said supporting console and said rotary table.

11. The machine recited in any one of claims 1–3, and further comprising several clamping pieces that act on said machine column to provide on said supporting console detachable clamping of said console in a desired swivel position.

* * * * *